(12) United States Patent
Brumm (10) Patent No.: US 10,222,046 B2
(45) Date of Patent: Mar. 5, 2019

(54) LED GROW LIGHT

(71) Applicant: Nextlight, LLC, Cincinnati, OH (US)

(72) Inventor: Nicholas David Brumm, Cincinnati, OH (US)

(73) Assignee: Nextlight, LLC, Cincinnati, OH (US)

( * ) Notice: Subject to any disclaimer, the term of this patent is extended or adjusted under 35 U.S.C. 154(b) by 334 days.

(21) Appl. No.: 14/976,364

(22) Filed: Dec. 21, 2015

(65) Prior Publication Data

US 2016/0178178 A1    Jun. 23, 2016

Related U.S. Application Data

(60) Provisional application No. 62/094,717, filed on Dec. 19, 2014.

(51) Int. Cl.

| | |
|---|---|
| *F21V 29/67* | (2015.01) |
| *F21V 23/02* | (2006.01) |
| *A01G 7/04* | (2006.01) |
| *F21V 11/06* | (2006.01) |
| *F21V 29/503* | (2015.01) |
| *F21V 29/508* | (2015.01) |
| *F21V 29/76* | (2015.01) |
| *A01G 9/26* | (2006.01) |
| *F21V 15/01* | (2006.01) |
| *F21Y 105/10* | (2016.01) |
| *F21Y 115/10* | (2016.01) |

(52) U.S. Cl.
CPC .............. *F21V 29/67* (2015.01); *A01G 7/045* (2013.01); *A01G 9/26* (2013.01); *F21V 11/06* (2013.01); *F21V 23/02* (2013.01); *F21V 29/503* (2015.01); *F21V 29/508* (2015.01); *F21V 29/763* (2015.01); *F21V 15/01* (2013.01); *F21Y 2105/10* (2016.08); *F21Y 2115/10* (2016.08); *Y02A 40/256* (2018.01); *Y02A 40/274* (2018.01)

(58) Field of Classification Search
CPC ........... A01G 7/045; A01G 9/26; F21V 11/06; F21V 15/01; F21V 23/02; F21V 29/67; F21V 29/503; F21V 29/508; F21V 29/763; F21Y 2105/10; F21Y 2115/10; Y02A 40/256; Y02A 40/274
USPC .......................... 362/122, 123, 290, 291, 292
See application file for complete search history.

(56) References Cited

U.S. PATENT DOCUMENTS 8,061,876 B2 * 11/2011 Oide ...................... F21V 7/0083
362/241

FOREIGN PATENT DOCUMENTS

WO    WO 2007147242 A1 * 12/2007    ............ F21V 29/004

* cited by examiner

*Primary Examiner* — Stephen F Husar
(74) *Attorney, Agent, or Firm* — Wood Herron & Evans LLP (57) ABSTRACT

An LED light source including a housing having a curved upper wall to resist the intrusion of water into the interior of the light housing and the electronics therein, internal structure defining an air flow path ensuring air flow over the heat sinks coupled to the LED light sources and power supplies, and LED light sources producing broad visible spectrum light having a generally white coloration.

27 Claims, 7 Drawing Sheets

LED GROW LIGHT

FIELD OF THE INVENTION

The present invention relates to grow lights for indoor greenhouses.

BACKGROUND OF THE INVENTION

Indoor grow lights have traditionally used incandescent or fluorescent light sources. Recently, grow lights have been introduced which use LED light sources. LED light sources, however, have unique requirements stemming from the relatively small size of the light source and the different configuration and size of the power supplies used by the lights. Moreover, LED lights using predominantly blue light LEDs can create a hard work environment in a grow room.

Accordingly, there is a need for an LED grow light that is configured particularly for the needs of the LED light source, particularly suitable for use in grow rooms, and which is more compatible with existing light sources.

BRIEF SUMMARY OF THE INVENTION

The present invention addresses these needs by providing an LED light source having unique features, including:

A housing having a curved upper wall, suitable for resisting the intrusion of water into the interior of the light housing and the electronics therein;

An internal structure with an air flow path ensuring air flow over the heat sinks coupled to the LED light sources and power supplies; and LED light sources producing broad visible spectrum light having a generally white coloration, compatible with existing light sources and providing a more comfortable working environment.

The above and other objects and advantages of the present invention shall be made apparent from the accompanying drawings and the description there.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

FIGS. 1, 2, 3, 6 and 7 illustrate the shape of the outer housing of an LED grow light in accordance with principles of the present invention, which has a curved upper wall, suitable for resisting the intrusion of water into the interior of the light housing and the electronics therein.

Figure 1:
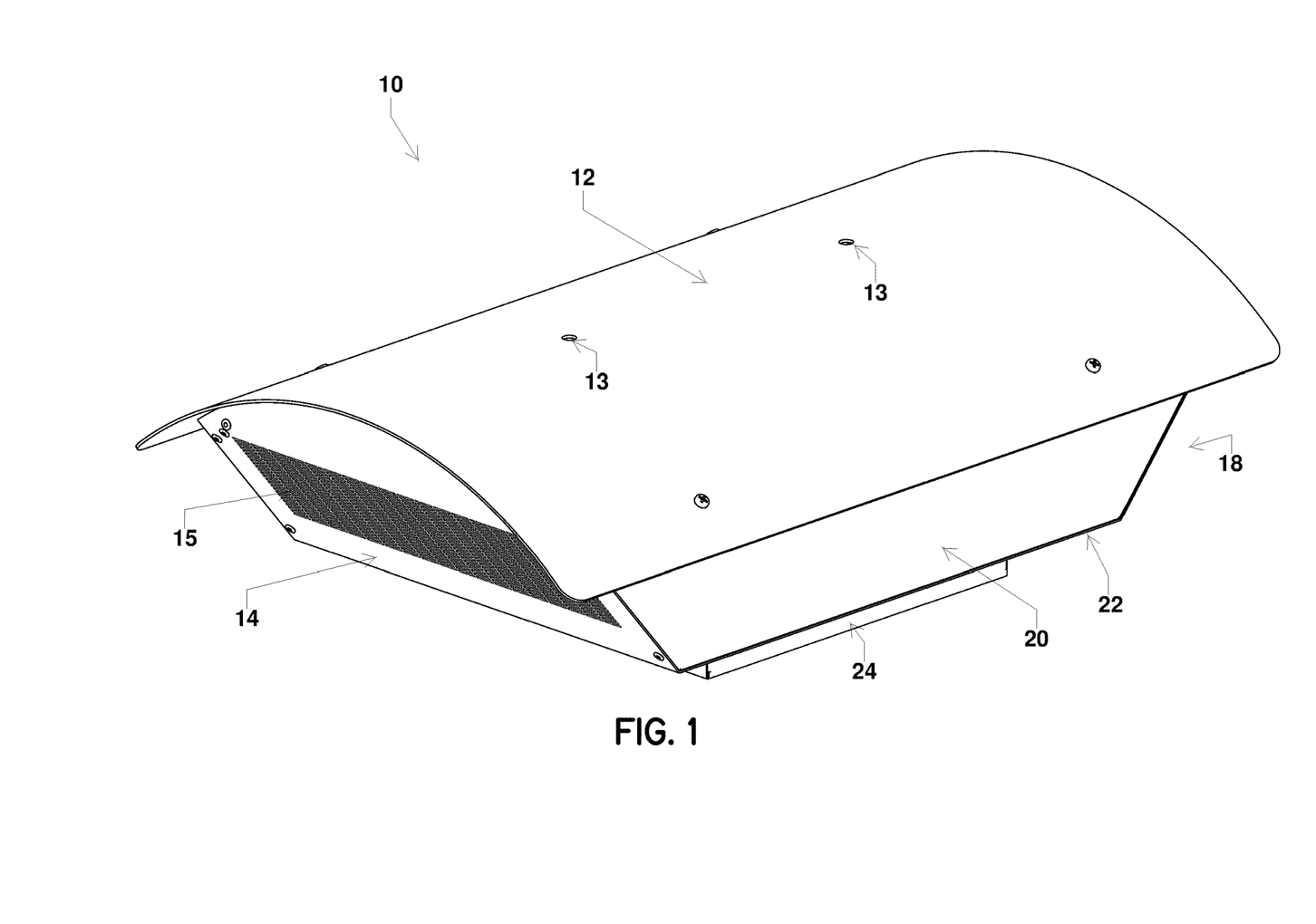
FIG. 1 is a perspective view of a grow light in accordance with principles of the present invention, showing the housing's curved top cover.
Figure 2:
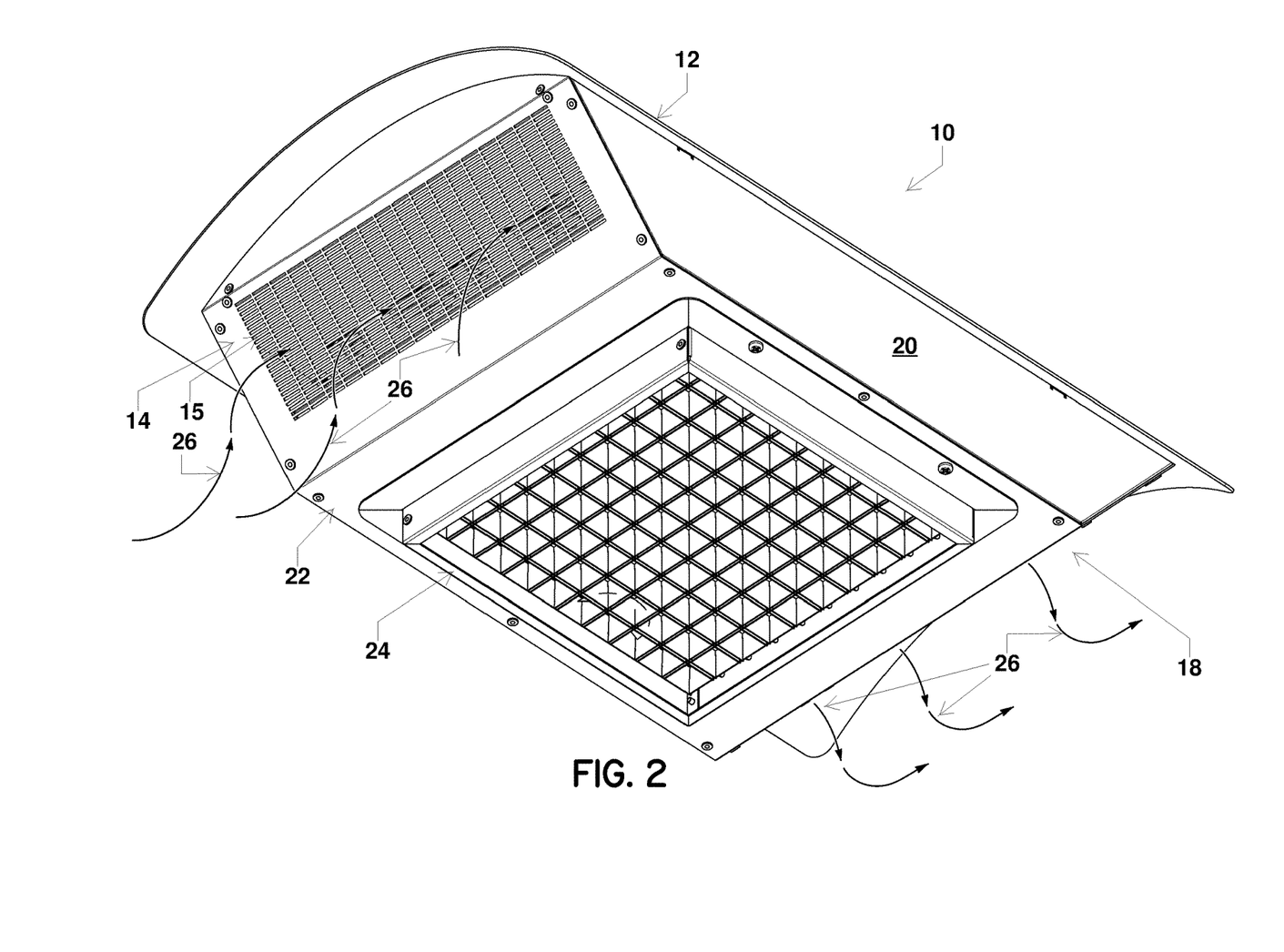
FIG. 2 is an underside perspective view of the grow light of FIG. 1.

As seen in FIG. 1, a grow light 10 according to principles of the present invention has an outer housing including a curved top cover 12, a front wall 14 with an inlet vent 15 and a similar rear wall 18 having an exit vent 19, side walls 20, and a bottom wall 22 that includes a light grating 24. Housing top cover 12 includes mounting holes 13 for hanging grow light 10 from a suitable ceiling-attached mounting. The details of light grating 24 are visible in FIG. 2; light grating 24 permits light from LED lights internal to the housing to be emitted downward onto plants beneath the grow light 10. FIG. 2 additionally illustrates the air flow path for cooling air that is draw through housing 10 to cool the LED lights and power supply within the housing. Air is generally drawn along path 26 through the inlet vent 15 in front wall 14, through the internal structures of the grow light 10, and exhausts out through the exit vent 19 in rear wall 18.

Figure 3:
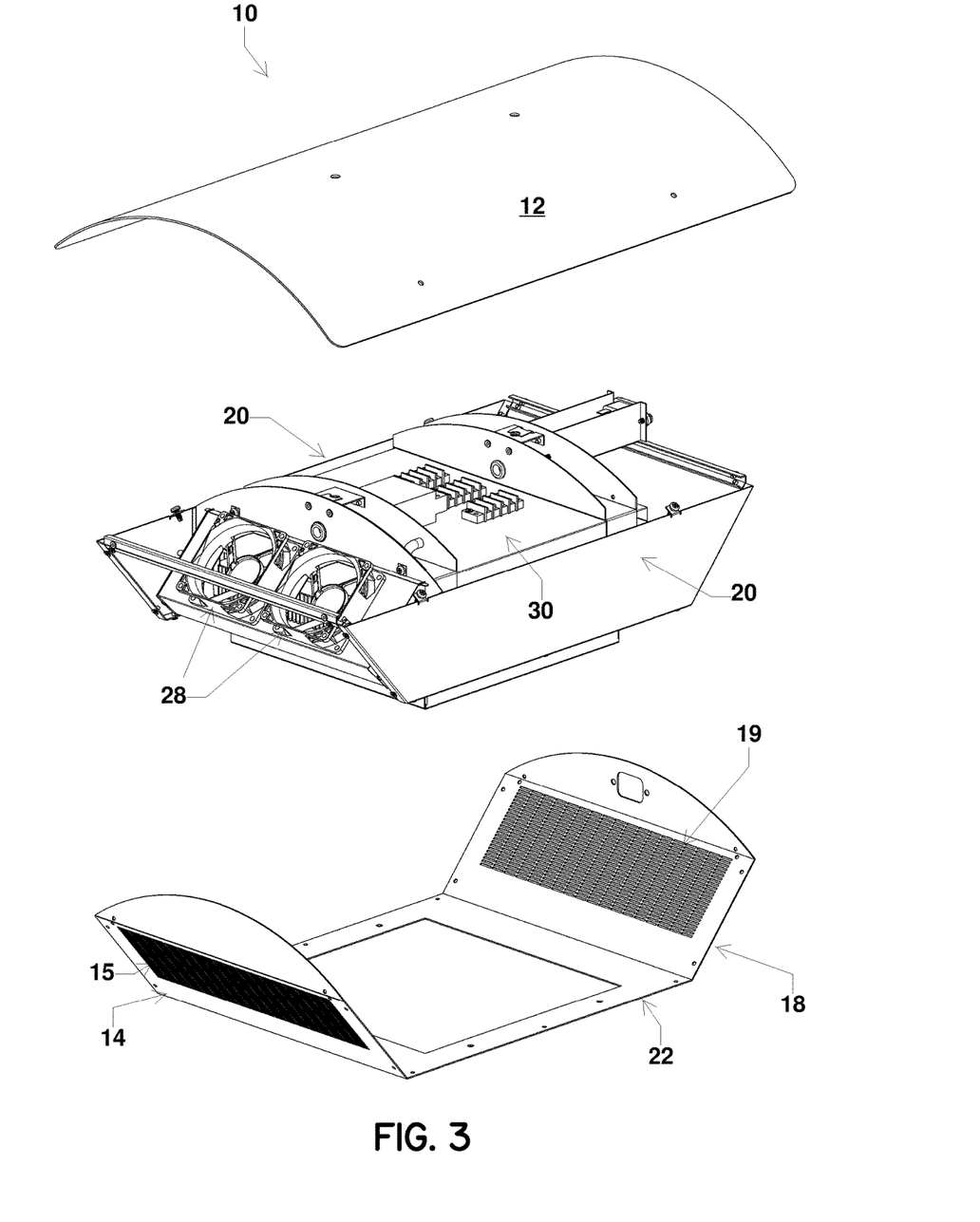
FIG. 3 is a disassembled perspective view of the grow light of FIG. 1.
Figure 4:
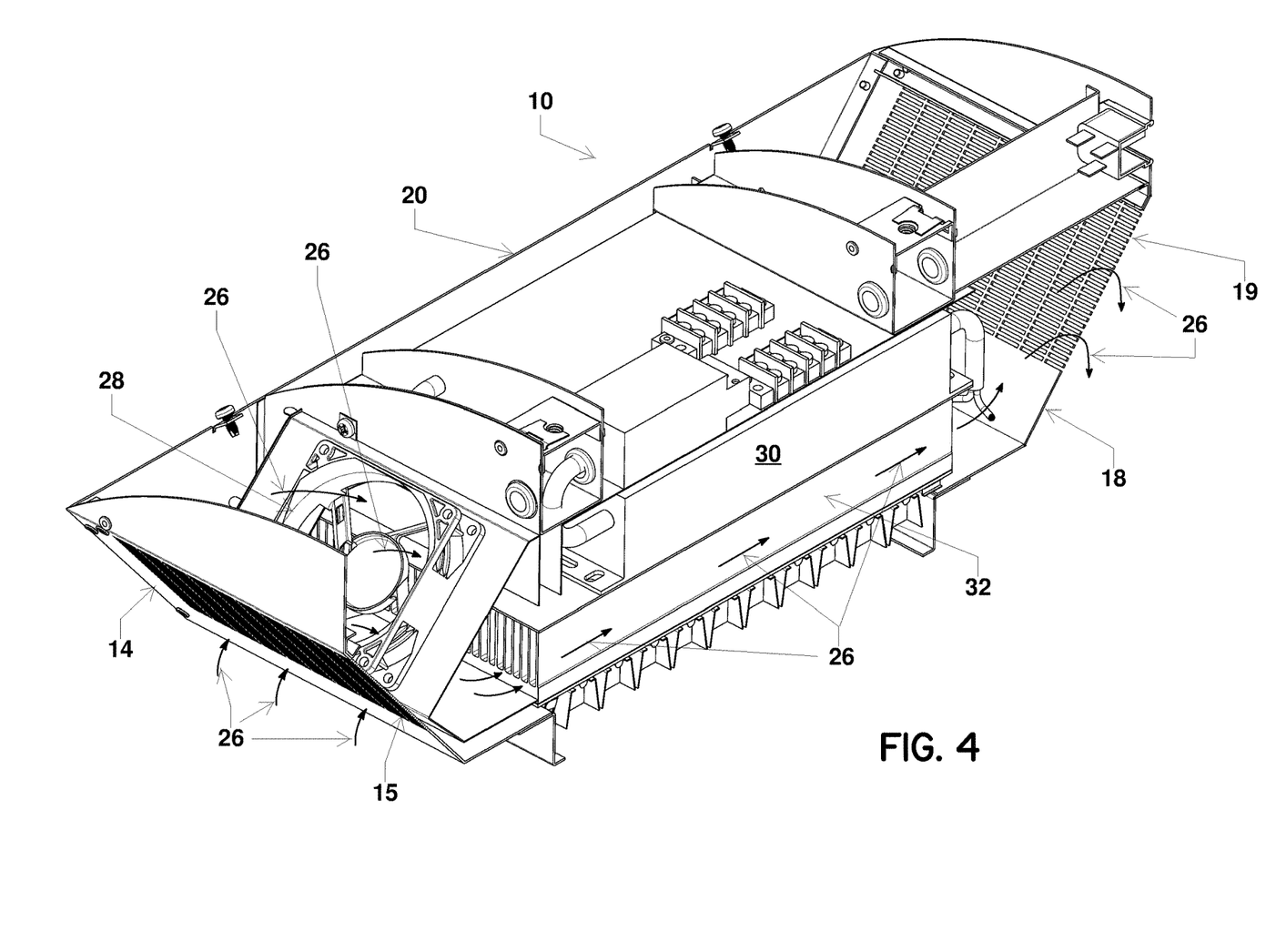
FIG. 4 is a longitudinal cross-sectional view of the central structure seen in FIG. 3, showing air flow paths through the structure.
Figure 5:
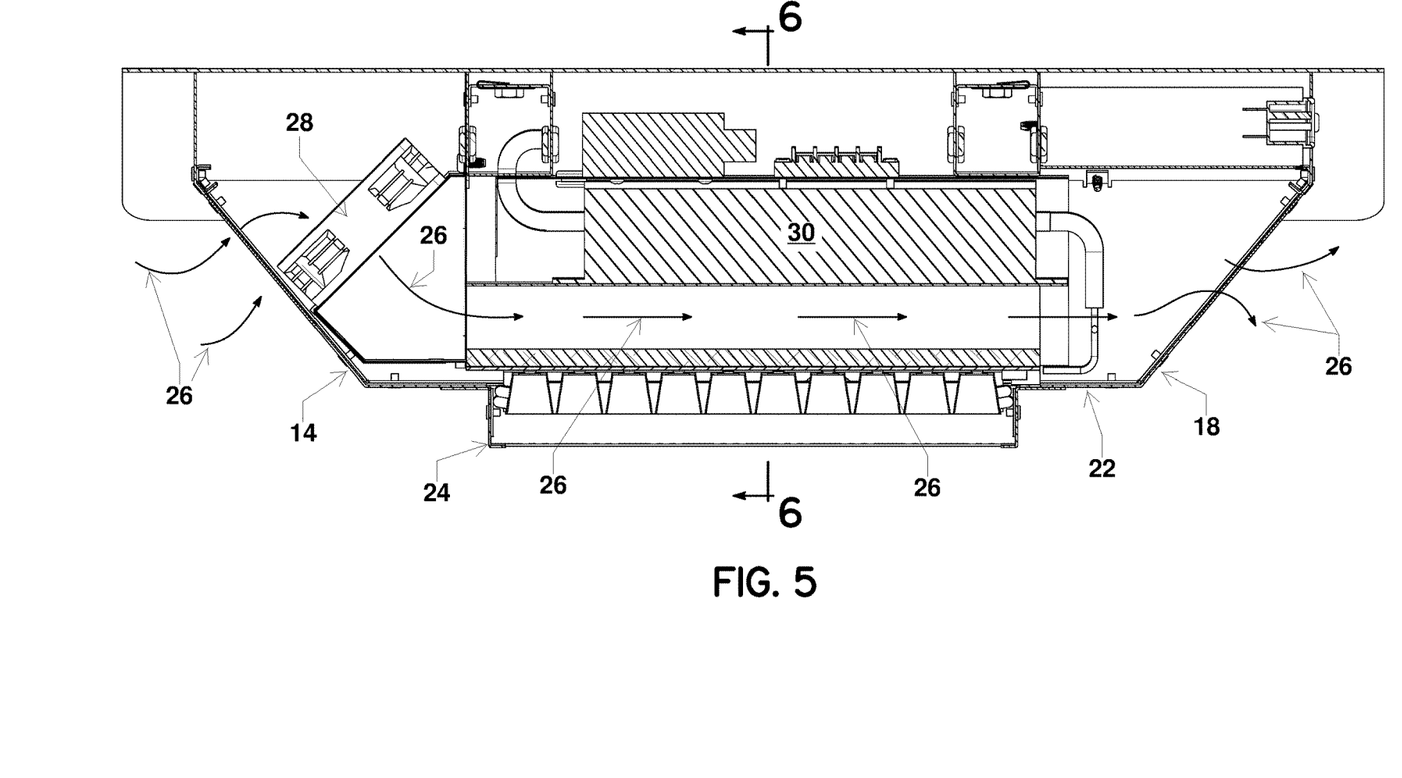
FIG. 5 is a longitudinal cross-sectional view of the central structure seen in FIG. 3, showing the air flow through the vanes of the LED heat sink.

As seen in FIG. 3, the internal structures of grow light 10 include dual fans 28 that drive the air flow along path 26. Power supply circuitry 30 (comprising power conditioners or transformers) included within the housing are cooled by this air flow, as described in greater detail below.

FIGS. 4, 5, 6 and 7 illustrate the internal structures of the LED grow light of the present invention, and demonstrate the air flow path 26 from the inlet vent 15, through the air fans 28 and internal structures of the light, to the exit vent 19 on the opposite side. Air flowing through the housing flows over the heat sink 32 internal to the housing to remove heat from the LED lights and power conditioner/transformers.

Figure 6:
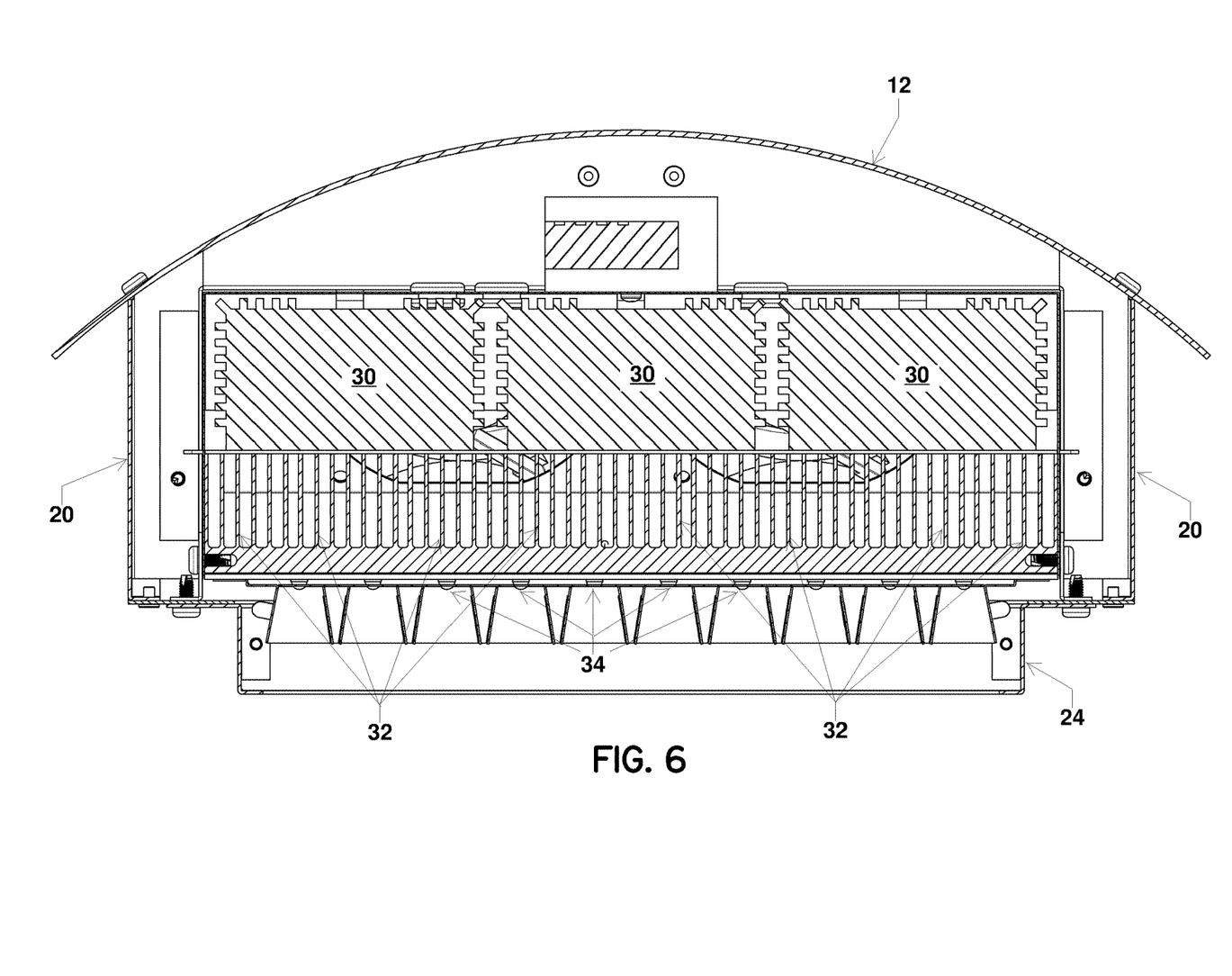
FIG. 6 is transverse cross-sectional view of the grow light of FIG. 1 taken along lines 6-6 in FIG. 5.
Figure 7:
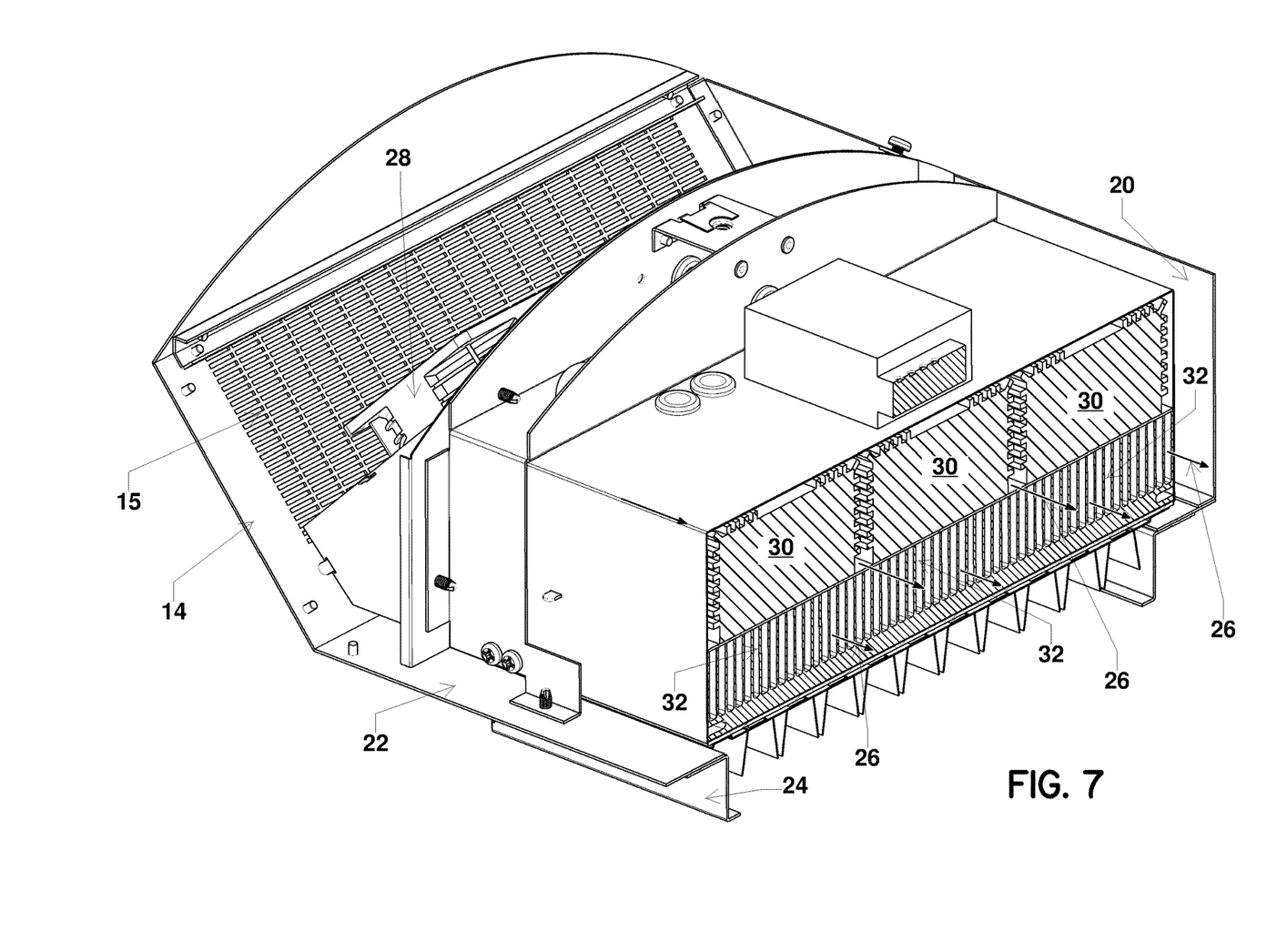
FIG. 7 a perspective view of the cross-sectioned grow light, sectioned as shown in lines 6-6 of FIG. 5; illustrating the air flow paths through the LED heat sink vanes and power supply heat sink vanes.

FIG. 6 illustrates the grid of LED light sources 34 on the bottom side of the housing. The light sources 34 are coupled to heat sink 32 internal to the housing, the vanes of which are in the air flow path (see FIG. 5). The LEDs chosen to produce broad spectrum visible light having a generally white appearance, e.g., using Cree XT-E White, XT-E High-Voltage White, XP-E White, XP-E High-Efficiency White, XLamp XM-L High Voltage White, XLamp XB-E High-Voltage White, X Lamp XB-G High-Voltage White, or other white LEDs. In other embodiments colored LED's may also be used and take advantage of the other features described herein.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed as new and desired to be protected by Letters Patent of the United States is:

1. A grow lamp, comprising
a housing comprising a top cover, front, rear and side walls, and a bottom wall, the bottom wall defining a light grating,
a plurality of light sources positioned within the housing to generate light which emits from the light grating, and
power supply circuitry for the light sources positioned within the housing,
wherein the top cover is curved downwardly to and overhangs the front, rear and side walls to limit intrusion of water from above the top cover from entering the interior of the housing and the circuitry therein.

2. The grow lamp of claim 1 wherein at least two of the front, rear, side and bottom walls include an air flow vent.

3. The grow lamp of claim 2 further comprising an air fan positioned within the housing between an inlet air flow vent and exit air flow vent to generate air flow between said vents.

4. The grow lamp of claim 3 further comprising a heat sink within the housing thermally coupled to one or both of the light sources and the power supply circuitry, the fan, the heat sink, the air fan and the air flow vents positioned such that air flow between said vents passes through the heat sink.

5. The grow lamp of claim 4 wherein the heat sink comprises air vanes, air flow between the vents passing through said vanes.

6. The grow lamp of claim 1 wherein the front wall includes an air inlet vent and the rear wall includes an air exit vent.

7. The grow lamp of claim 1 further comprising a heat sink within the housing, at least one of the front, rear, side and bottom walls of the housing including an air flow vent for air flow over the heat sink.

8. The grow lamp of claim 1, wherein the plurality of light sources are LED light sources which produce broad visible spectrum light having a generally white coloration.

9. A grow lamp, comprising
a housing comprising a top cover, front, rear and side walls, and a bottom wall, the bottom wall defining a light grating, at least two of the walls of the housing including an air flow vent, the air flow vents including an air inlet vent and air exit vent,
an air fan positioned within the housing between an air inlet vent and air exit vent to generate area flow between said vents,
a plurality of light sources positioned within the housing to generate light,
power supply circuitry for the light sources positioned within the housing, and
a heat sink within the housing, the heat sink thermally coupled to one or both of the light sources and the power supply circuitry, the heat sink, the air fan and the air flow vents positioned such that air flow between said vents passes through the heat sink.

10. The grow lamp of claim 9 wherein the top cover is curved downwardly to and overhangs the front, rear and side walls to limit intrusion of water from above the top cover from entering the interior of the housing and the circuitry therein.

11. The grow lamp of claim 9 wherein the heat sink comprises air vanes, air flow between the vents passing through said vanes.

12. The grow lamp of claim 9 wherein the front wall includes an air inlet vent and the rear wall includes an air exit vent.

13. The grow lamp of claim 9, wherein the plurality of light sources are LED light sources which produce broad visible spectrum light having a generally white coloration.

14. A grow light, comprising:
a housing comprising a top cover, front, rear and side walls, and a bottom wall, the bottom wall defining a light grating,
a plurality of light sources positioned within the housing to generate light, and
power supply circuitry for the light sources positioned within the housing,
wherein the front wall includes an air inlet vent and the rear wall includes an air exit vent.

15. The grow light of claim 14 wherein at least two of the front, rear, side and bottom walls include an air flow vent.

16. The grow light of claim 15 further comprising an air fan positioned within the housing between an inlet air flow vent and exit air flow vent to generate air flow between said vents.

17. The grow light of claim 16 further comprising a heat sink within the housing thermally coupled to one or both of the light sources and the power supply circuitry, the fan, the heat sink, the air fan and the air flow vents positioned such that air flow between said vents passes through the heat sink.

18. The grow light of claim 17 wherein the heat sink comprises air vanes, air flow between the vents passing through said vanes.

19. The grow light of claim 14 further comprising a heat sink within the housing, at least one of the walls of the housing including an air flow vent for air flow over the heat sink.

20. The grow light of claim 14, wherein the plurality of light sources are LED light sources which produce broad visible spectrum light having a generally white coloration.

21. A grow light, comprising:
a housing comprising a top cover, front, rear and side walls, and a bottom wall, the bottom wall defining a light grating,
a plurality of light sources positioned within the housing to generate light, and
power supply circuitry for the light sources positioned within the housing,
wherein the top cover is curved downwardly to and overhangs the front, rear and side walls to limit intrusion of water from above the top cover from entering the interior of the housing and the circuitry therein.

22. The grow light of claim 21 wherein at least two of the front, rear, side and bottom walls include an air flow vent.

23. The grow light of claim 22 further comprising an air fan positioned within the housing between an inlet air flow vent and exit air flow vent to generate air flow between said vents.

24. The grow light of claim 23 further comprising a heat sink within the housing thermally coupled to one or both of the light sources and the power supply circuitry, the fan, the heat sink, the air fan and the air flow vents positioned such that air flow between said vents passes through the heat sink.

25. The grow light of claim 24 wherein the heat sink comprises air vanes, air flow between the vents passing through said vanes.

26. The grow light of claim 21 further comprising a heat sink within the housing, at least one of the walls of the housing including an air flow vent for air flow over the heat sink.

27. The grow light of claim 21, wherein the plurality of light sources are LED light sources which produce broad visible spectrum light having a generally white coloration.

\* \* \* \* \*

UNITED STATES PATENT AND TRADEMARK OFFICE
CERTIFICATE OF CORRECTION

Page 1 of 1

PATENT NO. : 10,222,046 B2
APPLICATION NO. : 14/976364
DATED : March 5, 2019
INVENTOR(S) : Nicholas David Brumm It is certified that error appears in the above-identified patent and that said Letters Patent is hereby corrected as shown below:

In the Specification

Column 1, Lines 48-49, delete:
"FIG. 6 is transverse cross-sectional view of the grow light of FIG. 1 taken along lines 6—6 ..."
Insert:
--FIG. 6 is a transverse cross-sectional view of the grow light of FIG. 1 taken along line 6—6...--.

Column 1, Lines 50-51, delete:
"FIG. 7 a perspective view of the cross-sectioned grow light, sectioned as shown in lines 6—6 of FIG. 5; illustrating ..."
Insert:
--FIG. 7 is a perspective view of the cross-sectioned grow light, sectioned as shown in line 6—6 of FIG. 5; illustrating ...--.

Column 2, Line 19, delete:
"... for cooling air that is draw through housing 10 to cool the ..."
Insert:
--... for cooling air that is drawn through housing 10 to cool the ...--.

In the Claims

Column 3, Line 45-47, Claim 9, Lines 7-9, delete:
"...an air fan positioned within the housing between an air inlet vent and air exit vent to generate area flow between said vents, ..."
Insert:
--...an air fan positioned within the housing between an air inlet vent and air exit vent to generate air flow between said vents, ...--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*